(12) United States Patent
Marchini et al.

(10) Patent No.: US 12,012,527 B2
(45) Date of Patent: Jun. 18, 2024

(54) POLYOLEFIN-BASED HOT MELT ADHESIVE COMPOSITION

(71) Applicant: BASELL POLIOLEFINE ITALIA S.R.L., Milan (IT)

(72) Inventors: Roberta Marchini, Ferrara (IT); Silvia Guerra, Ferrara (IT); Stefano Pasquali, Ferrara (IT); Ankur Rastogi, Eschborn (DE); Stefano Spataro, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 710 days.

(21) Appl. No.: 17/261,100

(22) PCT Filed: Jul. 15, 2019

(86) PCT No.: PCT/EP2019/068940
§ 371 (c)(1),
(2) Date: Jan. 18, 2021

(87) PCT Pub. No.: WO2020/016144
PCT Pub. Date: Jan. 23, 2020

(65) Prior Publication Data
US 2021/0309892 A1    Oct. 7, 2021

(30) Foreign Application Priority Data
Jul. 18, 2018 (EP) .................................... 18184148

(51) Int. Cl.
| | | |
|---|---|---|
| *C09J 123/20* | (2006.01) | |
| *C08L 23/20* | (2006.01) | |
| *C09J 123/08* | (2006.01) | |
| *C08L 23/08* | (2006.01) | |

(52) U.S. Cl.
CPC ......... *C09J 123/20* (2013.01); *C08L 23/0815* (2013.01); *C08L 23/20* (2013.01); *C09J 123/0815* (2013.01)

(58) Field of Classification Search
CPC . C08L 23/0815; C08L 23/20; C09J 123/0815; C09J 123/20
See application file for complete search history.

(56) References Cited

U.S. PATENT DOCUMENTS

| | | | | |
|---|---|---|---|---|
| 10,894,850 B2 * | 1/2021 | Marchini | ................ | C08F 2/001 |
| 11,041,033 B2 * | 6/2021 | Marchini | ............... | C09J 123/20 |
| 11,060,002 B2 * | 7/2021 | Corzani | ................ | C09J 123/12 |
| 11,267,911 B2 * | 3/2022 | Marchini | ................ | C08F 10/08 |
| 11,267,912 B2 * | 3/2022 | Marchini | ............. | B01J 19/0046 |
| 2017/0029670 A1 * | 2/2017 | Spataro | ................. | C09J 123/18 |

FOREIGN PATENT DOCUMENTS

| | | |
|---|---|---|
| CN | 101432321 A | 5/2009 |
| CN | 103201302 A | 7/2013 |
| CN | 107614642 A | 1/2018 |
| EP | 3266825 A1 | 1/2018 |
| WO | 2018007451 A1 | 1/2018 |

OTHER PUBLICATIONS

International Search Report and Written Opinion dated Aug. 26, 2019 (Aug. 26, 2019) for Corresponding PCT/EP2019/068940.

* cited by examiner

*Primary Examiner* — Rip A Lee

(57) ABSTRACT

A polyolefin-based hot melt adhesive composition made from or containing
(A) 25-75 wt. % of a copolymer of butene-1 with a Melt Flow Rate, measured according to ISO 1133 (190° C., 2.16 kg), higher than 1500; and
(B) 75-25 wt. % of at least one additional component selected from the group consisting of waxes, resins, plasticizers, additional polymers and mixtures thereof, wherein the amounts of A) and B) are referred to the total weight of A)+B).

11 Claims, 2 Drawing Sheets

POLYOLEFIN-BASED HOT MELT ADHESIVE COMPOSITION

This application is the U.S. National Phase of PCT International Application PCT/EP2019/068940, filed Jul. 15, 2019, claiming benefit of priority to European Patent Application No. 18184148.7, filed Jul. 18, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polyolefin-based hot melt adhesive composition.

BACKGROUND OF THE INVENTION

In some instances, hot melt adhesive compositions are made from or containing butene-1 homo- or copolymers.

In some instances, the polybutene-1 used in the hot melt adhesive compositions are visbroken with peroxides to achieve low viscosity values. In some instances, peroxidic degradation causes unpleasant odor and high yellow index and prevents use of the composition in some technical fields, such as food packaging.

In some instances, ex-reactor low molecular weight polyolefins are used in hot melt adhesive compositions.

SUMMARY OF THE INVENTION

In a general embodiment, the present disclosure provides a hot melt adhesive composition made from or containing:
(A) 25-75 wt. % of a copolymer of butene-1 with at least one comonomer selected from the group consisting of ethylene, propylene, C5-C10 alpha-olefins and mixtures thereof, having copolymerized comonomer content of 0.5-5.0 wt. % and a melt flow rate (MFR) measured according to ISO 1133 (190° C., 2.16 kg) higher than 1500; and
(B) 75-25 wt. % of at least one additional component selected from the group consisting of waxes, resins, plasticizers, additional polymers and mixtures thereof, wherein the amounts of A) and B) are referred to the total weight of A)+B).

BRIEF DESCRIPTION OF THE DRAWINGS

The claimed subject matter may be understood by reference to the following description taken in conjunction with the accompanying figures in which:

DETAILED DESCRIPTION OF THE INVENTION

Figure 1:
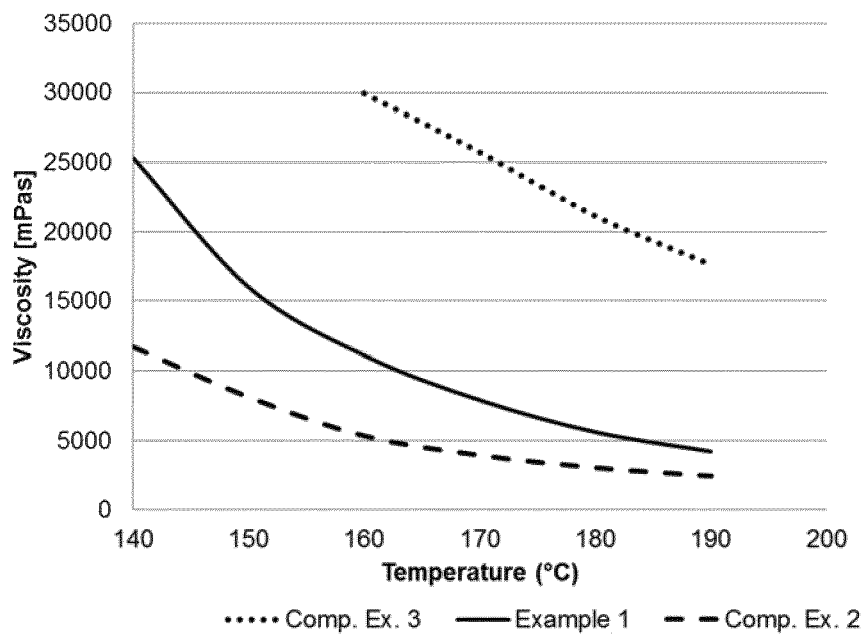
FIG. 1 provides line graphs showing the viscosity values at different temperatures of the hot melt adhesive composition of Example 1 and of Comparative Examples 2 and 3, measured at shear rate of 100 s$^{-1}$.

As used herein, the term "room temperature" refers to a temperature of 25±2° C. measured at 50% of relative humidity.

As used herein, the term "solid" refers to a material having a definite volume and shape at room temperature.

As used herein, the expression "not solid" refers to a matter which is "rheologically liquid", that is, a matter having a Viscous Modulus G" greater than the matter's Elastic Modulus G', or also, what is equivalent by definition, a Tan Delta greater than 1, wherein the values being measured at room temperature. As used herein, the expression encompasses matter that, even if the matter can be shaped in a certain shape, the matter (in a period of time not longer than one day) permanently deforms and spontaneously flows, even by the action of the matter's own weight, taking the shape of the container that contains the matter or of the solid surface on which the matter is lying. As used herein, the expression includes materials described as "liquid" as well as materials defined as "creamy", "pasty", "jelly-like", "fluid", "greasy", "semi-solid", and the like.

In a general embodiment, the present disclosure provides a hot melt adhesive composition made from or containing:
(A) 25-75 wt. % of a copolymer of butene-1 with at least one comonomer selected from the group consisting of ethylene, propylene, C5-C10 alpha-olefins and mixtures thereof, having copolymerized comonomer content of 0.5-5.0 wt. % and a melt flow rate (MFR) measured according to ISO 1133 (190° C., 2.16 kg) higher than 1500; and
(B) 75-25 wt. % of at least one additional component selected from the group consisting of waxes, resins, plasticizers, additional polymers and mixtures thereof, wherein the amounts of A) and B) are referred to the total weight of A)+B).

In some embodiments, the butene-1 copolymer component (A) has a melt flow rate (MFR) measured according to ISO 1133 (190° C., 2.16 kg) higher than 2000 g/10 min, alternatively higher than or equal to 2200 g/10 min, alternatively higher than or equal to 2400 g/10 min.

In some embodiments, the butene-1 copolymer component (A) has a MFR measured according to ISO1133 (190° C., 2.16 kg) lower than 3000 g/10 min., alternatively in the range higher than 1500-3000 g/10 min., alternatively in the range higher than 2000-2900 g/10 min., alternatively in the range 2200-2800 g/10 min, alternatively in the range 2400-2700 g/10 min.

In some embodiments, the at least one comonomer is selected from the group consisting of ethylene, propylene, C5-C10 alpha-olefins and mixtures thereof, alternatively selected from the group consisting of ethylene, propylene, hexene-1, octene-1 and mixture thereof.

In some embodiments, the at least one comonomer is ethylene.

In some embodiments, the butene-1 copolymer component (A) has a copolymerized comonomer content of 0.5-3.0 wt. %, alternatively of 0.7-2.0 wt. %. In some embodiments, the butene-1 copolymer component (A) has a copolymerized ethylene content of 0.5-3.0 wt. %, alternatively of 0.7-2.0 wt. %.

In some embodiments, the butene-1 copolymer component (A) has at least one of the following additional features:
(a) a molecular weight distribution (Mw/Mn) lower than 4, alternatively lower than 3; alternatively lower than 2.5, the lower limit being 1.5 in the cases; and/or
(b) a melting point (TmII) lower than 110° C., alternatively lower than 100° C., alternatively lower than 90° C.; and/or (c) a melting point (TmII) higher than 80° C.; and/or
(d) a glass transition temperature (Tg) in the range from −40° C. to −10° C., alternatively from −30° C. to −10° C.; and/or
(e) a rotational (Brookfield) viscosity at 180° C. (shear rate 100 s−1) lower than 8000 mPa·s, alternatively equal to or lower than 7000 mPa·s, alternatively equal to or lower than 6000 mPa·s, alternatively lower than 5000 mPa·s, the lower limit being 3000 mPa·s in the cases; and/or
(f) an X-ray crystallinity in the range 25-60%, alternatively in the range 35-60%.

In some embodiments, the butene-1 copolymer (A) has the additional features (a)-(f).

In some embodiments, the butene-1 copolymer component (A) has at least one of the further following additional features:
(i) an intrinsic viscosity (IV) measured in tetrahydronaphthalene (THN) at 135° C. equal to or lower than 0.8 dl/g, alternatively between 0.2 and 0.6 dl/g; and/or
(ii) a density of higher than 0.895-0.925 g/cm 3, alternatively of 0.900-0.920 g/cm$^3$, alternatively of 0.900-0.915 g/cm$^3$, alternatively of 0.902-0.915 g/cm$^3$.

In some embodiments, the butene-1 copolymer (A) has the additional features (i) and (ii).

In some embodiments, the butene-1 copolymer (A) has the additional features (a)-(f) and the additional features (i) and (ii).

In some embodiments, the butene-1 copolymer component (A) is obtained by copolymerizing butene-1 and the at least one comonomer in the presence of a catalyst system obtainable by contacting:
a stereorigid metallocene compound;
an alumoxane or a compound capable of forming an alkyl metallocene cation; and, optionally,
an organo aluminum compound.

Patent Cooperation Treaty Publication Nos. WO2004/099269 and WO2006/045687 are herein incorporated by reference. In some embodiments, the publications describe a process and a catalysts system for producing the butene-1 copolymer component (A).

In some embodiments, the butene-1 copolymer component (A) is obtained by a polymerization process carried out in one or more reactors connected in series. In some embodiments, the polymerization process is carried out in reactors connected in series and the catalyst is added in the first reactor, alternatively the catalyst is added in more than one reactor. In some embodiments, the polymerization process is carried out in the liquid phase, optionally in the presence of an inert hydrocarbon solvent, or in the gas phase, using fluidized bed or mechanically agitated gas phase reactors. In some embodiments, the polymerization process is carried out by using liquid butene-1 as polymerization medium. In some embodiments, the polymerization temperature ranges from 20° C. to 150° C., alternatively from 50° C. to 90° C., alternatively from 68° C. to 82° C.

In some embodiments, hydrogen is used to regulate the molecular weight of butene-1 copolymers. In some embodiments, the concentration of hydrogen during the polymerization reaction carried out in the liquid phase (molar ppm H2/(C4-)bulk) is higher than 2000 mol ppm and lower than 10000 mol ppm, alternatively from 3000 mol ppm to 10000 mol ppm, alternatively from 4000 to 6000 mol ppm.

In some embodiments, butene-1 copolymers having low melting point are obtained by selecting the copolymerized comonomer content. In some embodiments, butene-1 copolymers having low melting point are obtained by selecting the copolymerized ethylene content. In some embodiments, the butene-1 copolymer component (A) is obtained with a polymerization process wherein the amount of the comonomer in the liquid phase ranges from 0.1 wt. % to 1.8 wt. %, alternatively from 0.2 wt. % to 1.3 wt. %, with respect to the total weight of butene-1 monomer present in the polymerization reactor. In some embodiments, the comonomer is ethylene.

The hot melt adhesive composition is further made from or containing at least one additional component (B) selected from the group consisting of waxes (1), resins (2), plasticizers (3), additional polymers (4) and mixtures thereof.

In some embodiments, the at least one additional component (B) is solid at room temperature.

In some embodiments, the additional component (B) is not a "not solid" viscosity modifier.

In some embodiments, the at least one additional component (B) is selected from the group consisting of waxes (1), resins (2), additional polymers (4) and mixtures thereof.

In some embodiments, the at least one additional component (B) is selected from the group consisting of waxes (1), resins (2) and mixtures thereof.

In some embodiments, waxes (1) are selected from the group consisting of polyolefin waxes; natural (plant, animal or mineral) waxes; petroleum waxes; synthetic waxes made by polymerizing CO and H$_2$; naphthalenic waxes; and mixtures thereof. In some embodiments, the petroleum waxes are paraffin waxes. In some embodiments, the synthetic waxes made by polymerizing CO and H$_2$ are Fischer-Tropsch waxes. In some embodiments, waxes (1) are Fischer-Tropsch waxes.

In some embodiments, resins (2) used as component (B) are tackifiers that selected from the group consisting of hydrogenated hydrocarbon resins and derivatives thereof; terpene-derived resins; natural resins and natural resin esters; and mixtures thereof. In some embodiments, the hydrogenated hydrocarbon resins and derivatives thereof are selected from the group consisting of aliphatic hydrocarbon resins, aromatic hydrocarbon resins and aliphatic/aromatic hydrocarbon resins. In some embodiments, the terpene-derived resins are selected from the group consisting of polyterpenes and terpene/phenolic resins. In some embodiments, the natural resins and natural resin esters are selected from the group consisting of rosin, rosin ester and tall oil rosin ester. In some embodiments, resins (2) are hydrogenated hydrocarbon resins.

In some embodiments, plasticizers (3) are selected from the group consisting of plasticizing oils; olefin oligomers or low molecular weight polyolefins; and mixtures thereof. In some embodiments, the plasticizing oils are mineral oils. In some embodiments, the olefin oligomers or low molecular weight polyolefins are liquid polybutylenes.

In some embodiments, the at least one further component (B) is an additional polymer (4) selected from the group consisting of amorphous poly-alpha-olefins, thermoplastic polyurethanes, ethylene/(meth)acrylate copolymers, ethylene/vinyl acetate copolymers, and mixtures thereof.

In some embodiments, the hot melt adhesive composition is tailored for different applications. In some embodiments, the hot melt adhesive composition has a rotational (Brookfield) viscosity at 190° C. (shear rate 100 s−1) equal to or lower than 10000 mPa·s, alternatively lower than 7000 mPa·s, alternatively lower than 6000 mPa·s.

In some embodiments, the hot melt adhesive composition has rotational (Brookfield) viscosity at 170° C. (shear rate 100 s−1) equal to or higher than 6000 mPas·s, alternatively equal to or higher than 7000 mPas·s.

In some embodiments, the present disclosure provides a process for preparing an article of manufacture including the step of applying a hot melt adhesive composition to a substrate and an additional step selected from the group consisting of woodworking, packaging and assembling. In some embodiments, the hot melt adhesive composition is applied to a substrate and then used in woodworking, for packaging, in the general assembly field. In some embodiments, the hot melt adhesive composition is used to assemble components of electrical equipment, ceramics, furniture, textiles, upholstery, leather, plastic, paper and cardboard.

In some embodiments, the hot melt adhesive composition is made from or containing composition (i) made from or containing:
- (A) 65-75 wt. % of a copolymer of butene-1 with at least one comonomer selected from the group consisting of ethylene, propylene, C5-C10 alpha-olefins and mixtures thereof, having copolymerized comonomer content of 0.5-5.0 wt. % and a melt flow rate (MFR) measured according to ISO 1133 (190° C., 2.16 kg) higher than 1500; and
- (B.2) 25-35 wt. % of at least one resin,
  wherein the amounts of (A) and (B.2) are referred to the total weight of (A)+(B.2).

In some embodiments, composition (i) is used in woodworking and in the general assembly field. In some embodiments, composition (i) is used to assemble components of electrical equipment, ceramics, furniture, textiles, upholstery, leather, and plastic.

In some embodiments, composition (i) has a rotational (Brookfield) viscosity at 170° C. (shear rate 100 s−1) equal to or higher than 6000 mPas·s, alternatively equal to or higher than 7000 mPas·s.

In some embodiments, composition (i) has a rotational viscosity at 190° C. (shear rate 100 s−1) equal to or lower than 10000 mPa·s, alternatively lower than 7000 mPa·s, alternatively lower than 6000 mPa·s, and a rotational (Brookfield) viscosity at 170° C. (shear rate 100 s−1) equal to or higher than 6000 mPas·s, alternatively equal to or higher than 7000 mPas·s.

In some embodiments, the hot melt adhesive composition is made from or containing a composition (ii) made from or containing:
- (A) 30-40 wt. % of a copolymer of butene-1 with at least one comonomer selected from the group consisting of ethylene, propylene, C5-C10 alpha-olefins and mixtures thereof, having copolymerized comonomer content of 0.5-5.0 wt. % and a melt flow rate (MFR) measured according to ISO 1133 (190° C., 2.16 kg) higher than 1500;
- (B.2) 42-52 wt. % of at least one resin; and
- (B.1) 15-25 w.% of at least one wax,
  wherein the amounts of (A), (B.2) and (B.1) are referred to the total weight of (A)+(B.2)+(B.1). In some embodiments, composition (ii) is used in the packaging field. In some embodiments, composition (ii) is used to assemble paper or cardboard.

In some embodiments, composition (ii) has a rotational (Brookfield) viscosity at 170° C. (shear rate 100 s−1) equal to or lower than 2000 mPas·s, alternatively in the range 1000-2000 mPas·s.

In some embodiments, composition (ii) has a rotational viscosity at 190° C. (shear rate 100 s−1) equal to or lower than 10000 mPa·s, alternatively lower than 7000 mPa·s, alternatively lower than 6000 mPa·s, and a rotational (Brookfield) viscosity at 170° C. (shear rate 100 s−1) equal to or lower than 2000 mPas·s, alternatively in the range 1000-2000 mPas·s.

In some embodiments, the hot melt adhesive composition shows thermal stability and reduced color change.

In some embodiments, the hot melt adhesive composition is further made from or containing additives. In some embodiments, the additives are selected from the group consisting of antioxidants, UV stabilizers, aging protection agents, and mixtures thereof. In some embodiments, the additives are present in an amount from 0.01 to 1 wt. % with respect to the total weight of the hot melt adhesive composition.

In some embodiments, the hot melt adhesive composition is prepared by blending of the components in the molten state in a single- or twin screw extruder.

The following examples are illustrative only, and are not intended to limit the scope of the invention in any manner whatsoever.

EXAMPLES

The following analytical methods are used to determine the properties reported in the description and in the examples.

Melt flow rate (MFR) was measured according to ISO 1133 (190° C., 2.16 kg, except where different load and temperatures are specified).

Comonomer content (wt. %) measured via IR spectroscopy.

The spectrum of a pressed film of the polymer was recorded in absorbance vs. wavenumbers ($cm^{-1}$). The following measurements were used to calculate the ethylene content: a) area (At) of the combination absorption bands between 4482 and 3950 $cm^{-1}$ which was used for spectrometric normalization of film thickness;
  b) factor of subtraction ($FCR_{C2}$) of the digital subtraction between the spectrum of the polymer sample and the absorption band due to the sequences BEE and BEB (B: 1-butene units, E: ethylene units) of the methylenic groups ($CH_2$ rocking vibration);
  c) Area ($A_{C2,block}$) of the residual band after subtraction of the C2PB spectrum and came from the sequences EEE of the methylenic groups ($CH_2$ rocking vibration).

Apparatus

A Fourier Transform Infrared spectrometer (FTIR) was used. A hydraulic press with platens heatable to 200° C. (Carver or equivalent) was used.

Method

Calibration of (BEB+BEE) Sequences

A calibration straight line was obtained by plotting % (BEB+BEE) wt vs. $FCR_{C2}/A_t$. The slope Gr and the intercept $I_H$ were calculated from a linear regression.

Calibration of EEE Sequences

A calibration straight line was obtained by plotting % (EEE) wt vs. $A_{C2,block}/A_t$. The slope $G_H$ and the intercept $I_H$ were calculated from a linear regression.

Sample Preparation

Using a hydraulic press, a thick sheet was obtained by pressing about 1.5 g of sample between two aluminum foils. If homogeneity was in question, a minimum of two pressing operations occurred. A small portion was cut from the resulting sheet to mold a film. The film thickness ranged between 0.1-0.3 mm. The pressing temperature was 140±10° C. The IR spectrum of the sample film was collected as soon as the sample was molded.

Procedure

The instrument data acquisition parameters were as follows:
Purge time: 30 seconds minimum.
Collect time: 3 minutes minimum.
Apodization: Happ-Genzel.
Resolution: 2 cm$^{-1}$.
Collect the IR spectrum of the sample vs. an air background.

Calculation

Calculate the concentration by weight of the BEE+BEB sequences of ethylene units:

$$\%(BEE+BEB)\text{wt} = Gr\frac{FCR_{C2}}{A_t} + I_r$$

Calculate the residual area (AC2,block) after the subtraction, using a baseline between the shoulders of the residual band.

Calculate the concentration by weight of the EEE sequences of ethylene units:

$$\%(EEE)\text{wt} = G_H\frac{A_{C2,block}}{A_t} + I_H$$

Calculate the total amount of ethylene percent by weight:

% C2 wt=[% (BEE+BEB)wt+% (EEE)wt]

Mw/Mn determination. Measured by way of Gel Permeation Chromatography (GPC) in 1,2,4-trichlorobenzene (TCB). Molecular weight parameters (Mn, Mw, Mz) and molecular weight distributions Mw/Mn for the samples were measured by using a GPC-IR apparatus by PolymerChar, which was equipped with a column set of four PLgel Olexis mixed-bed (Polymer Laboratories) and an IR5 infrared detector (PolymerChar). The dimensions of the columns were 300×7.5 mm and their particle size was 13 μm. The mobile phase flow rate was kept at 1.0 mL/min. The measurements were carried out at 150° C. Solution concentrations were 2.0 mg/mL (at 150° C.) and 0.3 g/L of 2,6-diterbutyl-p-cresole were added to prevent degradation. For GPC calculation, a calibration curve was obtained using 12 polystyrene (PS) samples supplied by PolymerChar (peak molecular weights ranging from 266 to 1220000). A third-order polynomial fit was used to interpolate the experimental data and obtain the calibration curve. Data acquisition and processing was done by using Empower 3 (Waters). The Mark-Houwink relationship was used to determine the molecular weight distribution and the relevant average molecular weights: the K values were KPS=1.21×10$^{-4}$ dL/g and KPB=1.78×10$^{-4}$ dL/g for PS and polybutene (PB) respectively, while the Mark-Houwink exponents α=0.706 for PS and α=0.725 for PB were used.

For butene/ethylene copolymers, the composition was assumed constant in the whole range of molecular weight and the K value of the Mark-Houwink relationship was calculated using a linear combination as reported below:

$$K_{EB} = x_E K_{PE} x_B K_{PB}$$

where $K_{EB}$ was the constant of the copolymer, $K_{PE}$ (4.06×10$^{-4}$, dL/g) and $K_{PB}$ (1.78×10$^{-4}$ dL/g) were the constants of polyethylene (PE) and PB, $x_E$ and $x_B$ were the ethylene and the butene weight relative amount with $x_E+x_B=1$. The Mark-Houwink exponents α=0.725 was used for the butene/ethylene copolymers independently. End processing data treatment was fixed for the samples to include fractions up at 1000 in terms of molecular weight equivalent. Fractions below 1000 were investigated via GC.

The thermal properties were determined by Differential Scanning calorimetry (D. S. C.) on a Perkin Elmer DSC-7 instrument. The melting temperatures of butene-1 copolymers and of the HMA compositions were determined according to the following method:

TmII (melting temperature(s) measured in second heating run): a weighed sample (5-10 mg) obtained from the polymerization (or a weighed sample of the hot melt adhesive composition) was sealed into aluminium pans and heated at 200° C. with a scanning speed corresponding to 10° C./minute. The sample was kept at 200° C. for 5 minutes, thereby allowing complete melting of the crystallites and cancelling the thermal history of the sample. Successively, after cooling to −20° C. with a scanning speed corresponding to 10° C./minute, the peak temperature was taken as crystallization temperature (Tc). After standing 5 minutes at −20° C., the sample was heated for the second time at 200° C. with a scanning speed corresponding to 10° C./min. In this second heating run, the peak temperature(s) measured were marked as (TmII) and the area under the peak (or peaks) as global melting enthalpy (DH TmII).

The melting enthalpy and the melting temperature were measured also after aging (without cancelling the thermal history) as follows by using the Differential Scanning calorimetry (D.S.C.) on a Perkin Elmer DSC-7 instrument. A weighed sample (5-10 mg) obtained from the polymerization (or a weighed sample of the hot melt adhesive composition) was sealed into aluminium pans and heated at 200° C. with a scanning speed corresponding to 10° C./minute. The sample was kept at 200° C. for 5 minutes, thereby allowing complete melting of the crystallites. The sample was then stored for 10 days at room temperature. After 10 days, the sample was subjected to DSC, the sample was cooled to −20° C., and then the sample was heated at 200° C. with a scanning speed corresponding to 10° C./min. In this heating run, the peak temperature (or temperatures when more than one peak was present) were recorded as the melting temperatures (TmI), and the area under the peak (or peaks) as global melting enthalpy after 10 days (DH TmI).

Glass transition temperature (Tg) via Dynamic Mechanical Thermal Analysis (DMTA). Molded specimens of 76 mm by 13 mm by 1 mm were fixed to the DMTA machine for tensile stress. The frequency of the tension and relies of the sample was fixed at 1 Hz. The DMTA translates the elastic response of the specimen starting from −100° C. to 130° C. The elastic response was plotted versus temperature. The elastic modulus for a viscoelastic material was defined as E=E'+iE". In some instances, the DMTA split the two components E and E' by resonance and plotted E' vs temperature and E/E"=tan (δ) vs temperature. The glass transition temperature Tg was assumed to be the temperature at the maximum of the curve E/E"=tan (δ) vs temperature.

Rotational (Brookfield) Viscosity
for the polymer: measured at 180° C. and a deformation rate of and 100 s$^{-1}$, using a Rheolab QC instrument, which is a rotational rheometer, including a high-precision encoder and a dynamic EC motor. In some instances, the controlled shear rate (CR) or the controlled shear stress (CS) test settings were selected.

During the test, the sample was subjected at a deformation rate sweep from 1 s$^{-1}$ to 1000 s$^{-1}$. The torque was measured for each deformation rate and the corresponding viscosity was calculated by the instrument software;

for the hot melt adhesive composition: determined using a Bohlin Gemini viscometer (Malvern) and the following operative conditions: cone/plate 1°/20 mm; gap 30 micron; temperature range: 110°–190° C.; shear rate 100 s$^{-1}$.

Crystallinity was measured by X-Ray diffraction according to the following method: The instrument used to measure crystallinity was an X-ray Diffraction Powder Diffractometer (XDPD) that used the Cu-Kα1 radiation with fixed slits and collected spectra between diffraction angle 2Θ=5° and 2Θ=35° with step of 0.1° per 6 seconds.

The samples were diskettes of about 1.5-2.5 mm of thickness and 2.5-4.0 cm of diameter made by compression molding. The diskettes were aged at 23° C. for 96 hours.

The specimen was inserted in the XDPD sample holder. The XRPD instrument was set to collect the XRPD spectrum of the sample from diffraction angle 2Θ=5° to 2Θ=35° with step of 0.1° by using counting time of 6 seconds. At the end, the final spectrum was collected.

Ta was defined as the total area between the spectrum profile and the baseline expressed in counts/sec·2Θ. Aa was defined as the total amorphous area expressed in counts/sec·2Θ. Ca was total crystalline area expressed in counts/sec·2Θ.

The spectrum or diffraction pattern was analyzed in the following steps:
1) a linear baseline was defined for the whole spectrum and the total area (Ta) was calculated between the spectrum profile and the baseline;
2) an amorphous profile was defined along the whole spectrum, that separated the amorphous regions from the crystalline regions according to the two phase model;
3) the amorphous area (Aa) was calculated as the area between the amorphous profile and the baseline;
4) the crystalline area (Ca) was calculated as the area between the spectrum profile and the amorphous profile as Ca=Ta−Aa; and
5) the degree of crystallinity of the sample was calculated using the following formula: % Cr=100×Ca/Ta Intrinsic viscosity: determined in tetrahydronaphthalene at 135° C. according to ASTM D 2857.

Density: Determined according to ISO 1183-1, method A, Part 1: immersion method. Test specimens were obtained by compression molded plaques. Density was measured after 10 days conditioning.

Flexural modulus was measured according to ISO 178. Specimens for flexural test were cut from compression molded plaques pressed at 200° C. and aged via autoclave at room temperature for 10 min at 2 kbar. Specimens thickness was of 4 mm.

Preparation of catalyst components: Dimethylsilyl{(2,4,7-trimethyl-1-indenyl)-7-(2,5-dimethyl-cyclopenta[1,2-b:4,3-b']-dithiophene)} zirconium dichloride (A-1) was prepared as described in Example 32 of Patent Cooperation Treaty Publication No. WO0147939.

Preparation of the catalytic solution: Under nitrogen atmosphere, 6400 g of a 33 g/L solution of triisobutylaluminum (TIBA) in isododecane and 567 g of 30% wt/wt solution of methylalumoxane (MAO) in toluene were loaded in a 20 L jacketed glass reactor, stirred by an anchor stirrer, and allowed to react at 25° C. for about 1 hour under stirring.

After this time, 1.27 g of metallocene A-1 was added and dissolved under stirring for about 30 minutes.

The final solution was discharged from the reactor into a cylinder through a filter to remove eventual solid residues.

The composition of the solution resulted to be:

| Al (wt. %) | Zr (wt. %) | Al/Zr (mol ratio) | metallocene conc. (mg/l) |
|---|---|---|---|
| 1.72 | 0.0029 | 2001 | 137 |

Preparation of butene-1 copolymer [component (A)]: The polymerization was carried out in two stirred reactors operated in series, wherein liquid butene-1 constituted the liquid medium. The catalyst system was injected in both reactors, and the polymerization was carried out in continuous at a polymerization temperature of 75° C. The residence time in each reactor was in a range of 120÷200 min. The concentration of hydrogen during polymerization was 4900 ppm mol H2/(C4-) bulk. The comonomer was fed to the reactors in an amount of C2/C4—0.35% wt. The ethylene comonomer was copolymerized (C2—"stoichiometric" feed to the reactor). The catalyst yield (mileage) was 2000 kg/g metallocene active component. The butene-1 copolymer was recovered as melt from the solution and cut in pellets. The copolymer was further characterized, and the data are reported in Table 1.

TABLE 1

| MFR | g/10 min | 2500 |
|---|---|---|
| C2 (IR) | wt. % | 1.1 |
| IV | dl/g | 0.34 |
| Mw/Mn | | 2.1 |
| TmII | ° C. | 83.5 |
| TmI | | 103 |
| Tg | °C | −13 |
| Viscosity (180° C.) | mPa · s | 4200 |
| Crystallinity | % | 55 |
| Density | g/cm$^3$ | 0.912 |
| Flexural Modulus | MPa | 300-350 |

Preparation of the hot melt adhesive compositions: butene-1 copolymer obtained as described above (PB-1), or commercial polymers of the comparative examples, and the resin were melted in a ventilated oven at 170° C. and subsequently mixed in a high speed mixer (Thinky) at 1200 rpm. The mixing process was carried out in 2/3 steps:
step 1: about half of the amount of butene-1 copolymer, about half the amount of the resin and the whole amount of additive were loaded to the mixer and mixed for 8 minutes;
step 2: the rest of the polymer and the resin were loaded to the mixer and mixed for 8 minutes; and optionally
step 3: the composition was left to stand for 10 minutes and subsequently the wax was added.

The resulting blend was mixed for 8 minutes.

After complete mixing, the blend was poured onto a silicone-coated release paper, and an adhesive film of 300 μm was produced with a roller press.

Overlap Shear Strength (OLS). The overlap shear strength of the hot melt adhesive compositions was determined by adhering 300±50 mm2 of overlapping ends of specimens of different materials measuring 25×75×1.5 mm with a layer of the hot melt adhesive composition to be tested, such that the free ends of the specimens extend in opposite directions. The specimens were pressed together with 800 kPa=80N/cm$^2$ pressure for 30 seconds. The samples were tested after 24 h storage at room temperature (25°±2° C.). The free ends of the specimens were inserted in the jaws of a Zwick Roll Universal test system Type UTS 20 kN table module constructed to DIN EN 51220, Zwick GmbH & Co. KG 89079 Ulm. Load cell type U2A, 20 kN, Hottinger Baldwin Messtechnik, 64293 Darmstadt. The specimens were separated with an angle of 180°, pulling the jaws at a rate of 2 mm/min. The overlap shear strength value was recorded in MegaPascals (MPa).

The following conditioned materials were used:
aluminum alloy AlMg3 sand blasted with high-class corundum F100; cleaning standard SA ½ according to ISO 8501-1;
polypropylene (PP) cleaned with methyl ethyl ketone, 5 minutes drying time;
wood (beech): dust removed with compressed air, surface roughening with abrasive paper (80 grain size, dust removed with compressed air after abrasion.

Shear Adhesion Failure Temperature. Measured according to the test method PSTC-17 (Date of issuance12/12).

Open time. As used herein, the "open time" was defined as the longest time that an adhesive material remains capable of adhesion after the adhesive material has been cooled from the melt to room temperature. A uniform bead of 1.5 g/m of the hot melt adhesive composition molten at 170° C. was applied onto a specimen of cardboard substrate 200×24.8 mm at ambient temperature (one side coated, 400 g/m 2 chromo duplex cardboard GD2), and then the second cardboard specimen pressed on to the bead of hot melt adhesive composition by a 2 kg roller. After fixed intervals of 5 seconds, the second cardboard specimen was slowly pulled apart. The total time until no fiber tear occurred was recorded as the open time for the adhesive for that sample specimen. An average of the open time was taken from three such recordings. The relative open time is expressed as % with respect to the lowest value.

Example 1 and Comparative Examples 2-3

Hot melt adhesive compositions were prepared with the formulation indicated in Table 2. The hot melt adhesive compositions were tested for thermal properties, which are reported in Table 2.

TABLE 2

|  |  | Example 1 | Comp. ex. 2 | Comp. ex. 3 |
| --- | --- | --- | --- | --- |
| Vestoplast 608 | wt. % |  | 28 |  |
| Vestoplast 703 | wt. % |  | 41.5 |  |
| Vestoplast 708 | wt. % |  |  | 28 |
| Vestoplast 750 | wt. % |  |  | 41.5 |
| PB-1 | wt. % | 69.5 |  |  |
| Eastotack H130L | wt. % | 30 | 30 | 30 |
| AO-1010 | wt. % | 0.5 | 0.5 | 0.5 |
| TmI | ° C. | 100 | 38 | 42 |
| Tc | ° C. | / | 56 | 41 |
| Tg | ° C. | −26 | −21 | −17 |

Vestoplast 608, Vestoplast 703, Vestoplast 708 and Vestoplast 750 were amorphous alpha-olefin polymers having Ring and Ball softening point, measured according to DIN EN 1427, of 157° C., 124° C., 106° C. and 107° C. respectively, commercially available from Evonik.

Eastotac™ H-130L was a hydrogenated hydrocarbon resin, having a ring and ball softening point of 130° C., commercially available from Eastman Chemical Company.

Irganox™ 1010 was a sterically hindered phenolic antioxidant.

After first melting, the composition of Example 1 did not show any crystallization peak during cooling.

Figure 2:
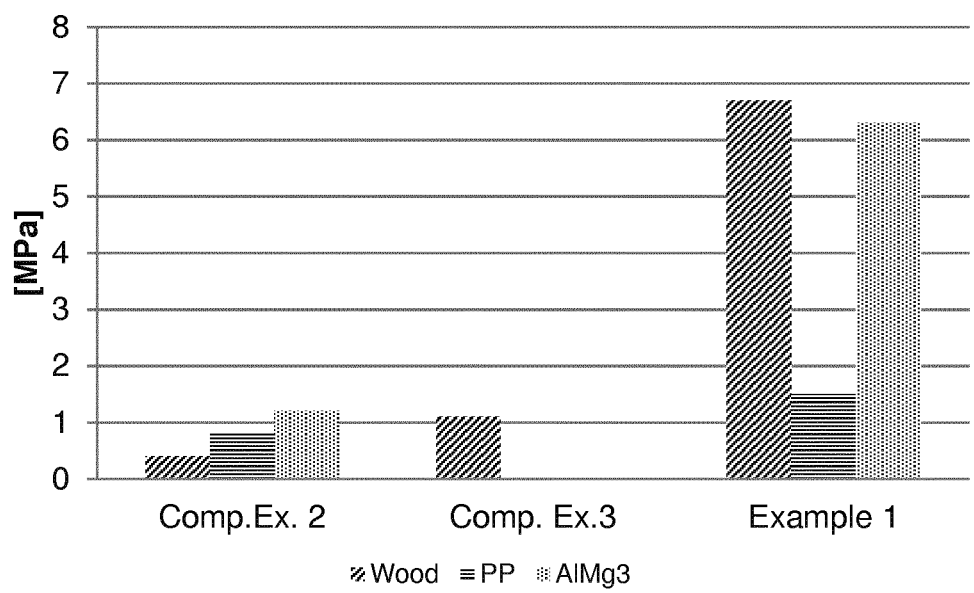
FIG. 2 provides bar graphs showing the Overlap Shear Strength values of the hot melt adhesive composition of Example 1 and of Comparative Examples 2 and 3.

FIG. 1 shows the viscosity values of the HMA compositions recorded at different temperatures. FIG. 2 shows the Overlap Shear Strength values.

The composition of Example 1 showed thermal stability after 48h storage in a ventilated oven at 180° C. in open glass beakers. The composition of Example 1 showed no gel formation or skinning and less color change compared to Examples 2 and 3.

The absolute and relative open time and the SAFT value of the hot melt composition of Example 1 and Comparative Example 2 are reported in Table 3.

TABLE 3

|  |  | Example 1 | Comp. ex. 2 |
| --- | --- | --- | --- |
| Open time | sec. | 323 | 243 |
| Relative open time | % | 133 | 100 |
| SAFT | ° C. | 90 | 64 |

Example 4 and Comparative Examples 5 and 6

Hot melt adhesive compositions were prepared with the formulation indicated in Table 4. The hot melt adhesive compositions were tested for thermal properties, which are reported in Table 4.

TABLE 4

|  |  | Example 4 | Comp. ex. 5 | Comp. ex. 6 |
| --- | --- | --- | --- | --- |
| Evatane 28420 | wt. % |  | 30.0 |  |
| Affinity G 1900 | wt. % |  |  | 34.7 |
| PB-1 | wt. % | 34.7 |  |  |
| Eastotack H130L | wt. % | 45.0 | 49.7 | 45.0 |
| Sassol Wax H1 | wt. % | 20.0 | 20.0 | 20.0 |
| AO-1010 | wt. % | 0.3 | 0.3 | 0.3 |
| TmI | ° C. | 99 | 104 | 85 |
| Tc | ° C. | 93 | 93 | 93 |
| Tg | ° C. | −23 | (*) | (*) |

(*) = not detectable

Evatane™ 28-420 was an EVA copolymer with a vinyl acetate content of 28 wt. %, commercially available from Arkema.

Affinity™ GA 1900 was a polyolefin elastomer, commercially available from Dow Chemicals.

Sasol Wax H1 was a Fischer-Tropsch wax, commercially available from Sasol.

The composition of Example 4 showed thermal stability after 48h storage in a ventilated oven at 180° C. in open glass beakers. The composition of Example 4 showed no gel formation or skinning and color retention compared to Comparative Examples 5 and 6.

Figure 3:
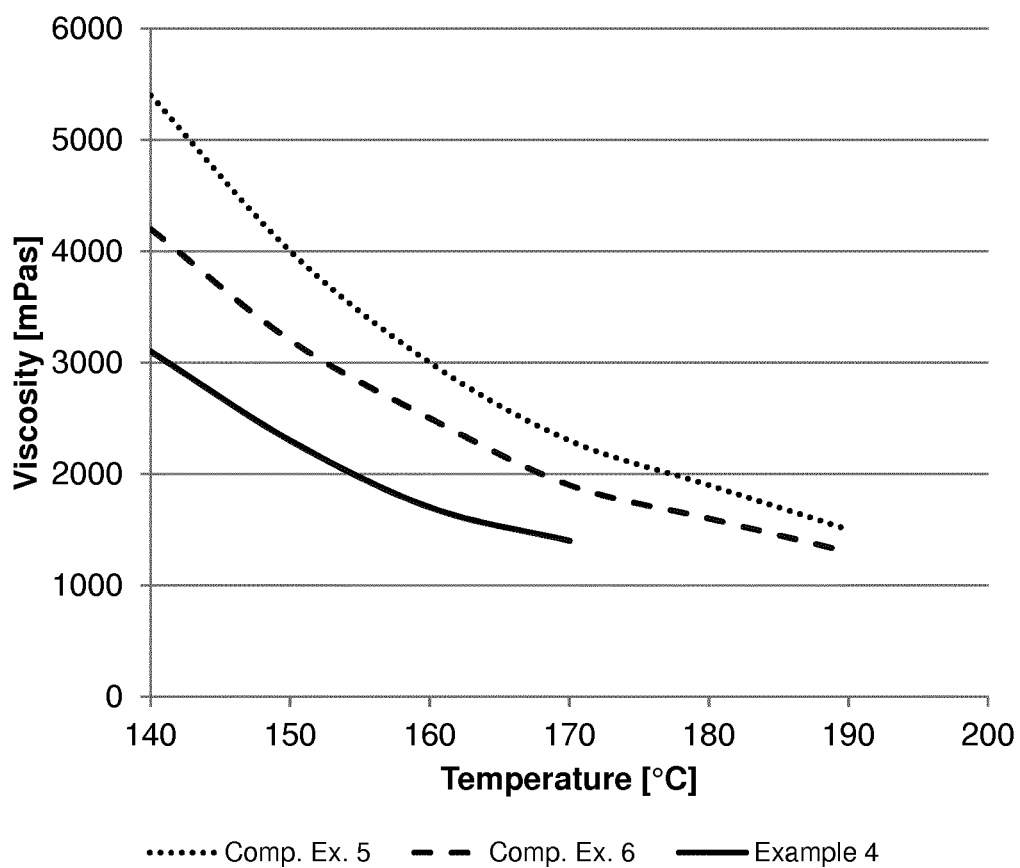
FIG. 3 provides line graphs showing the viscosity values at different temperatures of the hot melt adhesive composition of Example 4 and of Comparative Examples 5 and 6, measured at shear rate of 100 s$^{-1}$.

FIG. 3 shows the viscosity values of the hot melt adhesive compositions recorded at different temperatures.

What is claimed is:
1. A hot melt adhesive composition comprising:
(A) 25-75 wt % of a copolymer of butene-1 with at least one comonomer selected from the group consisting of ethylene, propylene, C5-C10 alpha-olefins and mixtures thereof, having copolymerized comonomer content of 0.5-5.0 wt % and a melt flow rate (MFR) measured according to ISO 1133 (190° C., 2.16 kg) higher than 2000 g/10 min; and

(B) 75-25 wt % of at least one additional component selected from the group consisting of waxes, resins, plasticizers, additional polymers and mixtures thereof, wherein amounts of A) and B) are relative to a total weight of A)+B).

2. The hot melt adhesive composition according to claim 1, wherein the copolymer of butene-1 (A) has a MFR measured according to ISO1133 (190° C., 2.16 kg) of higher than 2000 to 3000 g/10 min.

3. The hot melt adhesive composition according to claim 1, wherein the copolymer of butene-1 (A) has a copolymerized comonomer content of 0.5-3.0 wt %.

4. The hot melt adhesive composition according to claim 1, wherein the at least one comonomer is selected from the group consisting of ethylene, propylene, hexene-1, octene-1 and mixture thereof.

5. The hot melt adhesive composition according to claim 1, wherein the copolymer of butene-1 (A) has at least one of the following additional features:
   (a) a molecular weight distribution (Mw/Mn) lower than 4 and a lower limit being of 1.5;
   (b) a melting point (TmII) lower than 110° C.;
   (c) a melting point (TmII) higher than 80° C.;
   (d) a glass transition temperature (Tg) in a range from −40° C. to −10° C.;
   (e) a rotational viscosity at 180° C., shear rate 100 s−1, lower than 8000 mPa·s and a lower limit of 3000 mPa·s; or
   (f) an X-ray crystallinity in a range 25-60%.

6. The hot melt adhesive composition according to claim 1, wherein the composition has a rotational viscosity at 190° C. (shear rate 100 s−1) lower than 10000 mPa·s.

7. The hot melt adhesive composition according to claim 1, wherein the composition comprises:
   (A) 65-75 wt % of a copolymer of butene-1 with at least one comonomer selected from the group consisting of ethylene, propylene, C5-C10 alpha-olefins and mixtures thereof, having copolymerized comonomer content of 0.5-5.0 wt % and a melt flow rate (MFR) measured according to ISO 1133 (190° C., 2.16 kg) higher than 2000 g/10 min; and
   (B.2) 25-35 wt % of at least one resin,
   wherein amounts of (A) and (B.2) are relative to a total weight of (A)+(B.2).

8. The hot melt adhesive composition according to claim 1, wherein the composition comprises:
   (A) 30-40 wt % of a copolymer of butene-1 with at least one comonomer selected from the group consisting of ethylene, propylene, C5-C10 alpha-olefins and mixtures thereof, having copolymerized comonomer content of 0.5-5.0 wt % and a melt flow rate (MFR) measured according to ISO 1133 (190° C., 2.16 kg) higher than 2000 g/10 min;
   (B.2) 42-52 wt % of at least one resin; and
   (B.1) 15-25 w. % of at least one wax,
   wherein amounts of (A), (B.1) and (B.2) are relative to a total weight of (A)+(B.1)+(B.2).

9. A process for preparing an article of manufacture comprising the step of:
   applying a hot melt adhesive composition to a substrate and
   an additional step selected from the group consisting of woodworking, packaging and assembling,
   wherein the hot melt adhesive composition is selected from the group consisting
   (a0) (A) 25-75 wt % of a copolymer of butene-1 with at least one comonomer selected from the group consisting of ethylene, propylene, C5-C10 alpha-olefins and mixtures thereof, having copolymerized comonomer content of 0.5-5.0 wt % and a melt flow rate (MFR) measured according to ISO 1133 (190° C., 2.16 kg) higher than 2000 g/10 min; and
   (B) 75-25 wt % of at least one additional component selected from the group consisting of waxes, resins, plasticizers, additional polymers and mixtures thereof,
   wherein amounts of A) and B) are relative to a total weight of A)+B); and
   (ai) (A) 65-75 wt % of a copolymer of butene-1 with at least one comonomer selected from the group consisting of ethylene, propylene, C5-C10 alpha-olefins and mixtures thereof, having copolymerized comonomer content of 0.5-5.0 wt % and a melt flow rate (MFR) measured according to ISO 1133 (190° C., 2.16 kg) higher than 2000 g/10 min; and
   (B.2) 25-35 wt % of at least one resin wherein amounts of (A) and (B.2) are relative to a total weight weight of (A)+(B.2).

10. The process for preparing an article of manufacture according to claim 9, wherein the additional step is selected from the group consisting of woodworking and assembling and the hot melt adhesive composition is composition (ai).

11. The process for preparing an article of manufacture according to claim 9, wherein the additional step is packaging and the hot melt adhesive composition is composition (ai).

* * * * *